United States Patent [19]
Mallet

[11] 4,385,897
[45] May 31, 1983

[54] ASSEMBLY OF A DRIVING ELEMENT WITH COUPLING MEANS

[75] Inventor: Bernard Mallet, Limay, France

[73] Assignee: NADELLA, France

[21] Appl. No.: 239,130

[22] Filed: Feb. 27, 1981

[30] Foreign Application Priority Data

Feb. 28, 1980 [FR] France ............................... 80 04440

[51] Int. Cl.³ .......................... F16D 3/76; F16D 3/14
[52] U.S. Cl. .................................. 464/89; 464/182; 464/183
[58] Field of Search .................... 464/51, 70–72, 464/88–92, 182, 183

[56] References Cited

U.S. PATENT DOCUMENTS 3,808,838  5/1974  Bowen et al. ........................ 464/89
4,183,258  1/1980  Stephan ............................. 464/89 X

FOREIGN PATENT DOCUMENTS 2391390  12/1978  France .

Primary Examiner—John Petrakes
Attorney, Agent, or Firm—Robert E. Burns; Emmanuel J. Lobato; Bruce L. Adams

[57] ABSTRACT

In the assembly, an elastomeric sleeve is radially compressed between a cylindrical bore of a hub of a universal joint and the outer surface of a tubular element. The outer surface has for example a rectangular cross-sectional shape so that torque can be transmitted between the hub and the tubular element. In order to ensure that the transmission of torque is maintained in the event of failure of the sleeve, a washer, which the tubular element extends through normally without contact and which is fixed to the hub, ensures a rotational driving connection between the tubular element and the hub by a circumferential abutment of the tubular element with the inner opening of the washer when the elastomer of the sleeve is destroyed.

12 Claims, 4 Drawing Figures

ASSEMBLY OF A DRIVING ELEMENT WITH COUPLING MEANS

DESCRIPTION

The present invention relates to an assembly of a driving element with coupling means comprising a hub provided internally with an elastically yieldable sleeve which is radially compressed between the inner wall of the hub and the outer surface of the driving element, and a member mounted adjacent one of the ends of the hub and fixed to one of the elements, said member being normally out of contact with the other element but adapted to circumferentially abut said other element in the event of deterioration of the elastically yieldable sleeve so as to ensure the permanence of the drive.

Such an assembly, in which the elastically yieldable sleeve also acts as a vibration absorber, is known from French Pat. N° 2 391 390 (NADELLA). According to the known arrangement, the safety member, formed by a washer, requires splines for the fixing of this washer.

An object of the invention is to improve the known arrangement by rendering it capable of being used independently of the particular arrangement of the driving element whether the latter be a tube or a solid shaft and at the same time increase the strength of the safety device.

In the arrangement proposed by the invention, the mounted member is rigid with the hub and has an opening through which the driving element extends without contact.

According to another feature of the invention the mounted member is formed by a washer which is fitted forcefully in the bore of the end portion of the hub and in at least one radial cavity formed in said end portion.

Further features and advantages of the invention will be more clear from the ensuing description of two embodiments which are given merely by way of example and shown in the accompanying drawings, in which.

Figure 1:
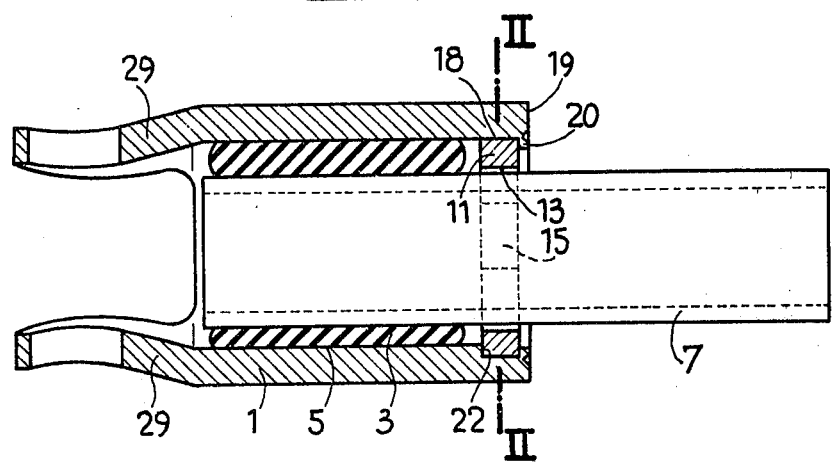
FIG. 1 is an axial sectional view of a first embodiment of the invention.
Figure 2:
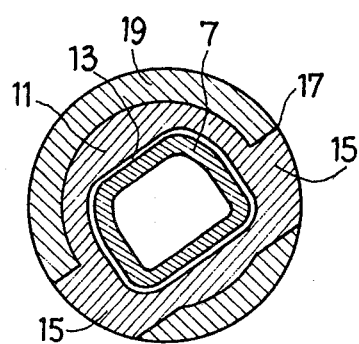
FIG. 2 is a sectional view taken on line II—II of FIG. 1.

FIG. 1 shows in axial section the first embodiment of the assembly according to the invention which comprises coupling means having a hub 1 preferably obtained by cutting the section of a drawn tube or by rolling and welding a sheet blank and provided internally with an elastically yieldable sleeve 3 which is radially compressed between at least one axial portion of the inner wall 5 of the hub and the outer surface of an element 7 which, in the illustrated embodiment, is tubular so that it may receive a shaft (not shown) so as to ensure, in normal operation and through the sleeve, the driving in rotation of the hub or vice-versa.

The permanence of the drive in the event of deterioration of the sleeve is achieved in accordance with the invention by a mounted member 11 formed for example by a washer provided, on one hand, with a substantially central non-circular opening 13 through which extends without contact, at least in normal operation, the tubular element 7 and, on the other hand, with at least one radial branch, and preferably two branches 15, each of which engages in an open radial cavity 17 formed in one end 19 of the hub. The washer is fitted in the bore 18 of the end portion 19 and in the cavity 17 by the branches 15 thereof so as to bear against the bottom 22 of the cavities, the axial immobilisation thereof being ensured reliably by means of a localised or non-localised forming over 20 of the end portion 19 onto the adjacent face of the washer 11.

It will be clear from the foregoing description that the assembly according to the invention permits, by the absence of contact between the member 11 and the tubular element 7, a filtration in normal operation of vibrations while ensuring the permanence of the drive, when, owing to a deterioration of the elastomer, the relative angular movement between the member and the tubular element exceeds a predetermined value, owing to the cooperation, namely the circumferential abutment between this member and this element resulting from the correspondence of their shapes, by the use, for example, of a tubular element of approximately rectangular or trapezoidal section which extends through the opening 13 of similar shape.

Figure 3:
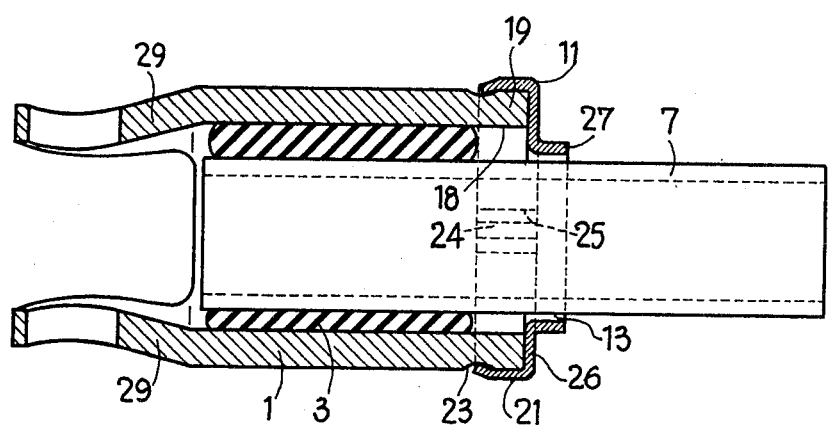
FIG. 3 is an axial sectional view of a second embodiment.
Figure 4:
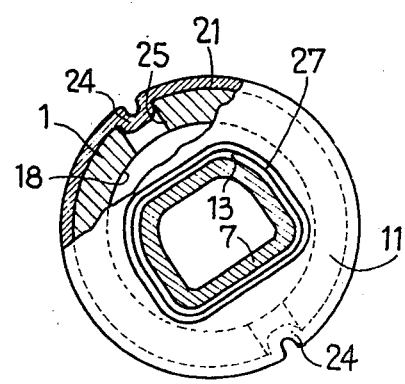
FIG. 4 is an end view of the embodiment shown in FIG. 3 with a part cut away.

FIGS. 3 and 4 show a second embodiment which differs from the first embodiment in that the mounted member 11 comprises a substantially cylindrical portion 21 which externally caps the end portion 19 of the hub and which is immobilised axially thereon by the cooperation thereof with a circumferential groove 23 formed in said end portion, and circumferentially by the engagement of at least one localised pleat 24 of the member 11, for the purpose of achieving an improved gripping by reduction in its diameter, in at least one and preferably two axial cavities 25 formed in the end portion 19. The cylindrical portion 21 is externally extended by a radial portion 26 whose inner edge is connected to an axial skirt 27 the radial dimension of which is, at every point, less than the diameter of the cylinder defined by the bore 18, this skirt having extending therethrough without contact the tubular element 7 in normal operation.

As in the foregoing arrangement, when a relative angular movement between the tubular element 7 and the member 11 exceeds, owing to a deterioration of the elastomer, a predetermined value, the drive is ensured by the mutual contact thereof resulting from the cross-sectional shapes, for example trapezoidal shapes, of the skirt 27 and the tubular element 7.

As shown in FIGS. 1 to 4, the sleeve for which the member 11 constitutes an axial safety abutment is located in the middle part of the hub so as to permit, on one hand, the mounting of the member 11 at the end 19 of the hub and, on the other hand, the cutting out of the other end for defining the two branches 29 of a universal joint yoke or, by way of a modification, at least one ear substantially contained in a plane perpendicular to the axis of the hub for the fixing thereof to a support.

It must be understood that the scope of the invention is not intended to be limited to these embodiments which have been given solely by way of examples, but covers all technical equivalents of the means described within the scope of the claims.

Having now described my invention what I claim as new and desire to secure by Letters Patent is:

1. A co-axial assembly comprising a driving element coupling means having a hollow hub which defines an inner wall, an elastically yieldable sleeve which is interposed in a radially compressed state between said inner wall of the hub and an outer surface of the driving element, and a member rigidly mounted on the hub adjacent one end of the hub, said member defining an opening through which opening the driving element extends with clearance between the driving element and said member, said element having a non-circular cross-sectional shape with rounded corners and said opening in said member having such non-circular shape that said rounded corners are capable of contacting and bearing against said member in an oblique manner were it not for the action of said elastically yieldable sleeve which is operative to normally maintain the driving element out of contact with said member but which, in the event of deterioration of the elastically yieldable sleeve, allows said oblique contact to occur so as to ensure the permanence of a drive between the driving element and the coupling means.

2. An assembly according to claim 1, wherein the driving element is a tubular element adapted to receive a shaft.

3. An assembly according to claim 1, wherein the hub defines a bore and at least one radial cavity in an end portion of the hub and said member is a washer which is fitted in the bore and in said at least one radial cavity.

4. An assembly according to claim 3, comprising a formed-over portion of the end portion of the hub which formed-over portion engages a peripheral portion of the washer and maintains the washer in position axially of the hub.

5. An assembly according to claim 1, wherein said member has a substantially cylindrical portion which caps an end portion of the hub on which end portion it is clamped by a pinching effect of a localised pleat of said cylindrical portion which pleat engages at least one axial cavity in said end portion.

6. An assembly according to claim 5, comprising a groove in the hub, said member being cooperative with said groove so as to be maintained in position axially of the hub with reliability.

7. An assembly according to claim 6, wherein said cylindrical portion of said member is extended by a narrower portion forming a skirt which defines said opening through which the driving element extends.

8. An assembly according to claim 5, wherein said cylindrical portion of said member is extended by a narrower portion forming a skirt which defines said opening through which the driving element extends.

9. An assembly according to any one of the claims 1 to 8, wherein the driving element has a cross-sectional shape which is substantially identical to the cross-sectional shape of said opening through which the driving element extends.

10. An assembly to claim 9, wherein said cross-sectional shape is polygonal with said rounded corners on said element.

11. An assembly according to any one of the claims 1 to 8, wherein the hub defines two branches of a universal joint yoke.

12. An assembly according to any one of the claims 1 to 8, wherein the hub defines at least one fixing branch contained in a plane substantially perpendicular to the axis of the hub.

* * * * *